United States Patent Office 3,088,832
Patented May 7, 1963

---

3,088,832
ALUMINA BASE CERAMIC
Arthur V. Somers, Flushing, Mich., assignor to General Motors Corporation, Detroit, Mich., a corporation of Delaware
No Drawing. Filed June 7, 1961, Ser. No. 115,322
3 Claims. (Cl. 106—39)

This invention relates to ceramics and has as its principal object the provision of an improved alumina base ceramic particularly useful for spark plug insulators and also finding utility for industrial ceramics, insulators for vacuum tubes and the like.

The quality of a high alumina ceramic is largely determined by its precise crystalline structure and hence it is important that the extent and nature of crystal growth during firing be closely controlled. Grain growth is a function of firing temperature and time and, in general, the lower the firing temperature for any given firing time which can be used to accomplish vitrification to a dense nonporous body, the more desirable will be the grain structure and therefore the physical properties of the fired body. I have found that the addition of a small amount, not in excess of about 1.5% by weight, of niobia to the alumina raw batch assists materially in reducing the required firing temperature and hence in controlling growth during firing, thereby resulting in a highly improved alumina base body. As an attendant effect the niobia also increases the shrinkage and therefore the density accomplished at the lower firing temperature without adversely affecting the desired insulating properties of the resulting body. Densities in excess of 3.9 can be achieved. The surfaces of the fired parts are sufficiently smooth that the normal practice of glazing can be eliminated in many applications where such practice is presently essential.

Briefly, the ceramic composition of this invention comprises aluminum oxide at least 95% by weight, and niobium oxide up to 1.5% by weight, if desired, other fluxing oxides may be included such, for example, as the alkaline earth metal oxides, manganese oxide, chromium oxide and silica either as such or in the combined form of a silicate such as talc, clay or mullite. The combination of niobia, an alkaline earth oxide and silica is particularly desirable as the flux additive. It will be understood that the niobium oxide or other additive oxides need not be added to the raw batch as such but can, if desired, be added in a combined form which yields the oxide upon firing, for example, as a carbonate.

The following specific examples of ceramics embodying the invention will serve to illustrate.

Example I

A raw batch is formed by wet grinding and mixing 99% by weight alkali-free aluminum oxide and 1% niobium oxide for about 10 hours. A 2% aqueous wax emulsion is added, the material spray dried in accordance with conventional practice and the wax-bonded dried material is then pressed into blanks either in steel dies or by isostatic molding. The formed blanks are then bisque fired to about 2000° F. for 4 hours after which they are ground to final shape. The parts are then fired to about 2600° F. to 2900° F. in an oxidizing atmosphere on a 24-hour schedule, maximum temperature being achieved in about 12 hours and held for 2 hours. If desired, the bodies can be formed to final shape in the pressing or forming operation and the bisque firing and grinding steps eliminated.

Example II

Same as Example I except that the raw batch consists of alumina 98%, niobia 1.5% and magnesia .5%.

Example III

Same as Example I except that raw batch consists of alumina 97%, niobia .9%, kaolin 1%, talc .8% and strontium carbonate .3%.

It will be understood that while the invention has been described particularly by reference to particular embodiments thereof, changes and modifications may be made, all within the full and intended scope of the claims which follow.

I claim:
1. A fired ceramic body characterized by a high fired density of at least about 3.9 and showing on chemical analysis aluminum oxide at least 95% by weight and at least a small but effective amount up to 1.5% by weight niobium oxide to provide said high fired density.
2. A fired ceramic body characterized by a high fired density of at least about 3.9 and showing on chemical analysis aluminum oxide at least 95% by weight, at least a small but effective amount up to 1.5% by weight niobium oxide to provide said high fired density and the remainder substantially all at least one oxide selected from the group consisting of the alkaline earth metal oxides and silicon dioxide.
3. A method for making a ceramic body comprising the steps of forming a mixture containing at least 95% by weight aluminum oxide and at least a small but effective amount up to 1.5% by weight niobium oxide and then firing said mixture at a temperature of from 2600° F. to 2900° F., said niobium oxide being effective to provide said body with a density of at least 3.9.

References Cited in the file of this patent
UNITED STATES PATENTS

| | | |
|---|---|---|
| 2,413,441 | Feichter | Dec. 31, 1946 |
| 2,975,145 | Harris | Mar. 14, 1961 |
| 3,019,116 | Doucette | Jan. 30, 1962 |